United States Patent
Medvinsky

(10) Patent No.: US 7,421,083 B2
(45) Date of Patent: Sep. 2, 2008

(54) SYSTEM FOR SEAMLESSLY UPDATING SERVICE KEYS WITH AUTOMATIC RECOVERY

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 718 days.

(21) Appl. No.: 10/117,938

(22) Filed: Apr. 5, 2002

(65) Prior Publication Data

US 2002/0146132 A1 Oct. 10, 2002

Related U.S. Application Data

(60) Provisional application No. 60/282,379, filed on Apr. 5, 2001.

(51) Int. Cl.
*H04L 9/00* (2006.01)

(52) U.S. Cl. .................. 380/279; 380/273; 713/155

(58) Field of Classification Search ................. 380/273, 380/279

See application file for complete search history.

(56) References Cited

U.S. PATENT DOCUMENTS

| | | | | |
|---|---|---|---|---|
| 5,515,439 | A * | 5/1996 | Bantz et al. ................. | 713/156 |
| 6,073,242 | A * | 6/2000 | Hardy et al. .................... | 726/1 |
| 6,175,920 | B1 * | 1/2001 | Schanze ...................... | 713/150 |
| 6,198,824 | B1 * | 3/2001 | Shambroom ................ | 380/279 |
| 6,240,187 | B1 * | 5/2001 | Lewis .......................... | 380/282 |
| 6,253,326 | B1 * | 6/2001 | Lincke et al. ................. | 726/12 |
| 6,256,741 | B1 * | 7/2001 | Stubblebine ................. | 713/150 |
| 6,445,797 | B1 * | 9/2002 | McGough .................... | 380/285 |
| 6,684,331 | B1 * | 1/2004 | Srivastava ................... | 713/163 |
| 6,782,103 | B1 * | 8/2004 | Arthan et al. ............... | 380/278 |
| 6,792,424 | B1 * | 9/2004 | Burns et al. ..................... | 707/9 |

(Continued)

FOREIGN PATENT DOCUMENTS

JP         06311228 A   * 11/1994

OTHER PUBLICATIONS

Adamson et al., "Joining Security Realms", Feb. 7, 1995. http://www.citi.umich.edu/techreports/reports/citi-tr-95-1.pdf.*

(Continued)

*Primary Examiner*—Gilberto Barron, Jr.
*Assistant Examiner*—Virgil Herring
(74) *Attorney, Agent, or Firm*—Stewart M. Wiener

(57) ABSTRACT

Application servers are programmed such that when an application server changes a compromised service key, the compromised key is saved by the application server until all tickets that may have been issued under the compromised key expire. Whenever the application server receives a ticket from a client issued under the compromised key, it generates an authenticator for an error message using the session key extracted from the ticket and sends the error message with this authenticator to the client. Clients are programmed to be able to receive error messages from application servers that have changed their service keys. Because the error messages include an authenticator generated by the application server using the session key extracted from the compromised ticket, the client is able to rely on the error message. The client is able to automatically request a new ticket from a key distribution center in response to a successful authentication of the error message.

8 Claims, 3 Drawing Sheets

U.S. PATENT DOCUMENTS

| | | | | |
|---|---|---|---|---|
| 6,907,127 | B1 * | 6/2005 | Kravitz et al. | 380/277 |
| 6,947,556 | B1 * | 9/2005 | Matyas et al. | 380/29 |
| 7,047,405 | B2 * | 5/2006 | Mauro | 713/166 |
| 2001/0032254 | A1 * | 10/2001 | Hawkins | 709/219 |
| 2002/0002468 | A1 * | 1/2002 | Spagna et al. | 705/1 |
| 2002/0007453 | A1 * | 1/2002 | Nemovicher | 713/155 |
| 2002/0116632 | A1 * | 8/2002 | Itoh et al. | 713/200 |

OTHER PUBLICATIONS

Bellovin et al., "Limitation of the Kerberos Authentication System", USENIX—Winter '91. http://citeseer.ist.psu.edu/3136.html.*

Itoi, "Secure Coprocessor Integration with Kerberos V5", 9th USENIX Security Symposium, Aug. 14-17, 2000. http://www.usenix.org/publications/library/proceedings/sec2000/full_papers/itoi/itoi.pdf.*

Bella, "Kerberos Version IV: Inductive Analysis of the Secrecy Goals", ESORICS '98, 1998. http://citeseer.ist.psu.edu/61361.html.*

Sirbu et al., "Distributed Authentication in Kerberos using Public Key Cryptography", Carnegie Mellon University. 1997. http://ieeexplore.ieee.org/iel3/4421/12557/00579231.pdf?tp=&arnumber=579231&isnumber=12557.*

Kohl, "The Kerberos Network Authentication Service (V5)", Networking Working Group Request for Comments: 1510, Sep. 1993. http://citeseer.ist.psu.edu/654839.html.*

* cited by examiner

SYSTEM FOR SEAMLESSLY UPDATING SERVICE KEYS WITH AUTOMATIC RECOVERY

CROSS-REFERENCE TO RELATED APPLICATIONS

This application claims priority from U.S. Provisional Patent Application No. 60/282,379 filed Apr. 5, 2001, entitled SYSTEM FOR SEAMLESSLY UPDATING KERBEROS SERVICE KEYS WITH AUTOMATIC RECOVERY FOR KERBEROS CLIENTS, the disclosure of which is hereby incorporated by reference in its entirety as if fully set forth in the present invention, for all purposes.

BACKGROUND OF THE INVENTION

The present invention relates to the field of communication systems and more specifically to a system for automatically recovering from service key changes.

Third party authentication is used for validating an entity's identity in a communication network. As an example, if a client wishes to access an application server, a third party authentication service can validate the client's identity to determine whether the client is authorized to access the application server. Validation is possible because both the client and the server initially pre-register with the third party authentication service. Upon registration, the third party authentication service issues a secret key to the client and another secret key to the application server. These keys are saved by the authentication service and later employed for identity validation.

An example of a conventional third party authentication protocol is Kerberos. In Kerberos, a ticket is issued to a client by the KDC (Key Distribution Center) and is used to provide a client with access to an application server. The ticket contains the client's name, network address, the application server's name, a timestamp, and a secret session key. Before the ticket is delivered to the client, the ticket is encrypted with the application server's service key (shared between the KDC and the application server). The client is also provided with a copy of the session key that is encrypted with the client's key (shared between Kerberos and the client). The client creates an authenticator and encrypts it with the session key. The client then presents the encrypted ticket along with the authenticator to the application server.

The authenticator is an additional credential for further validating the client's identity. The authenticator contains the client's name, a timestamp, and other information. Note that this authenticator is encrypted with a copy of the same session key provided in the ticket. The KDC provides this copy separately from the ticket because the client cannot decrypt the ticket.

After the ticket and the authenticator are received, the application server uses its service key to decrypt the ticket, and to retrieve the clear information including the session key. This session key is used to decrypt the authenticator, and to retrieve the clear information from the authenticator. Next, the application server compares the information in the authenticator with the information in the ticket, the client's network address with the address the request was sent from, and the timestamp with the current time. If the information matches, then access to the application server is provided to the client.

Problems, such as disruption of service, can occur when an application server service key that has been compromised is changed. If the client is unaware of the change in service key, the client will continue to use the stale ticket, thus resulting in loss of service.

The application server may respond in several ways to the client's continuing use of a stale ticket. One way is to remain silent and to refrain from acknowledging the access request. This technique results in a temporary disruption of service. The client, unaware of the service key change, continuously uses the stale ticket to request access to the application server. After a number of unsuccessful attempts, the client requests a new ticket from the Kerberos KDC (key distribution center). A new ticket encrypted with a new service key is issued to the client. The client employs the new ticket to request service from the application server and service is thus continued.

Another way the application server denies service is by sending an error message to the client. The error message indicates that the service key has been compromised. The client can respond in a number of ways. First, it may ignore the message, and continue to request access to the application server. This is a typical client reaction because, in existing systems, error messages are not authenticated and may have been sent by a third party interested in disrupting service. Thus, the client continues to request access until its ticket expires.

Another way for the client to respond is to request a new ticket from the KDC. The client can use this new ticket to request application server access. A problem with a client requesting a new ticket in response to an error message is that an inauthentic error message may be received by the client from a third party interested in disrupting service. The third party could duplicate a first error message and replay to send a second error message. If the client returns to the KDC for a new ticket, receives the ticket and presents the new ticket to the application server, again, an inauthentic error message can be sent. This cycle can be continued and the KDC may be kept too busy to respond to legitimate ticket requests from other clients.

The KDC may notice the multiple requests from the same client to access the same application server before a current ticket expires. Accordingly, the KDC may deny all further ticket requests. Since this action denies further service to the affected client, a third party has disabled a client without any cryptographic key knowledge.

BRIEF SUMMARY OF THE INVENTION

One aspect of the present invention is a method for automatically recovering when an application server service key is changed. This change in service key occurs, for example, after an existing service key has been compromised. Thereafter, a new service key is issued to the application server by a KDC. However, many clients remain unaware of the service key change, and continue to use tickets encrypted with the compromised service key to request access to the application server. When a request accompanied by a ticket encrypted with the compromised service key is received, the application server does not undesirably deny service. Rather, it sends an error message with an authenticator to the client. By adding an authenticator to the error message, the application server assures the client that the error message is authentic. The client knows, for example, that the message is not from a third party who is interested in disrupting service.

Upon receiving the error message, the client automatically contacts the KDC for a new ticket and, in turn, the KDC issues the new ticket to the client. Note that this new ticket is encrypted with the new service key previously copied to the application server. The client then presents the new ticket to the application server to access the desired service. Since the new ticket is encrypted with the new service key, access to the desired service is granted by the application server. In this manner, the client automatically recovers from the change of service key, and disruption of service to the client is avoided.

According to another aspect of the present invention, a method for seamlessly updating a compromised service key is disclosed. The method includes the steps of providing a session key from the client to an application server. This session key is encrypted with the compromised service key. Other steps include using the compromised service key to derive the session key; and sending an error message from the application server to the client, the error message being accompanied by an authenticator keyed with the session key. Further, a new session key is automatically requested after the error message is received by the client. This new session key is forwarded to the application server by the client. Note that the new session key is encrypted with a new service key.

According to another aspect of the present invention, a method for allowing a client to recover from a change in an application server service key is disclosed. The method includes the steps of receiving an error message with an authenticator from an application server; authenticating the error message; and in response to a successful authentication of the error message, requesting a new ticket for accessing the application server.

According to another aspect of the present invention, a processor readable storage medium, having a processor readable program code is disclosed. The processor readable program code is operable to cause a processor to perform a method for allowing a client to recover from a change in an application server service key. This method includes the steps of receiving an error message and an authenticator from an application server; authenticating the error message; and in response to a successful authentication of the error message, requesting a new ticket from a key distribution center for the application server.

According to another aspect of the present invention, a processor readable storage medium is disclosed. The processor has processor readable program code that is operable to cause a processor to perform a method for allowing a client to recover from a change in an application server service key from a compromised service key to a new service key. This method includes the steps of receiving from a client a ticket encrypted with a compromised service key; decrypting the ticket using the compromised service key; and using the session key from the compromised service key to generate an authenticator that is sent along with the error message to the client.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

The Figures are more thoroughly explained in the following detailed description of the invention.

DETAILED DESCRIPTION OF THE INVENTION

Figure 1:
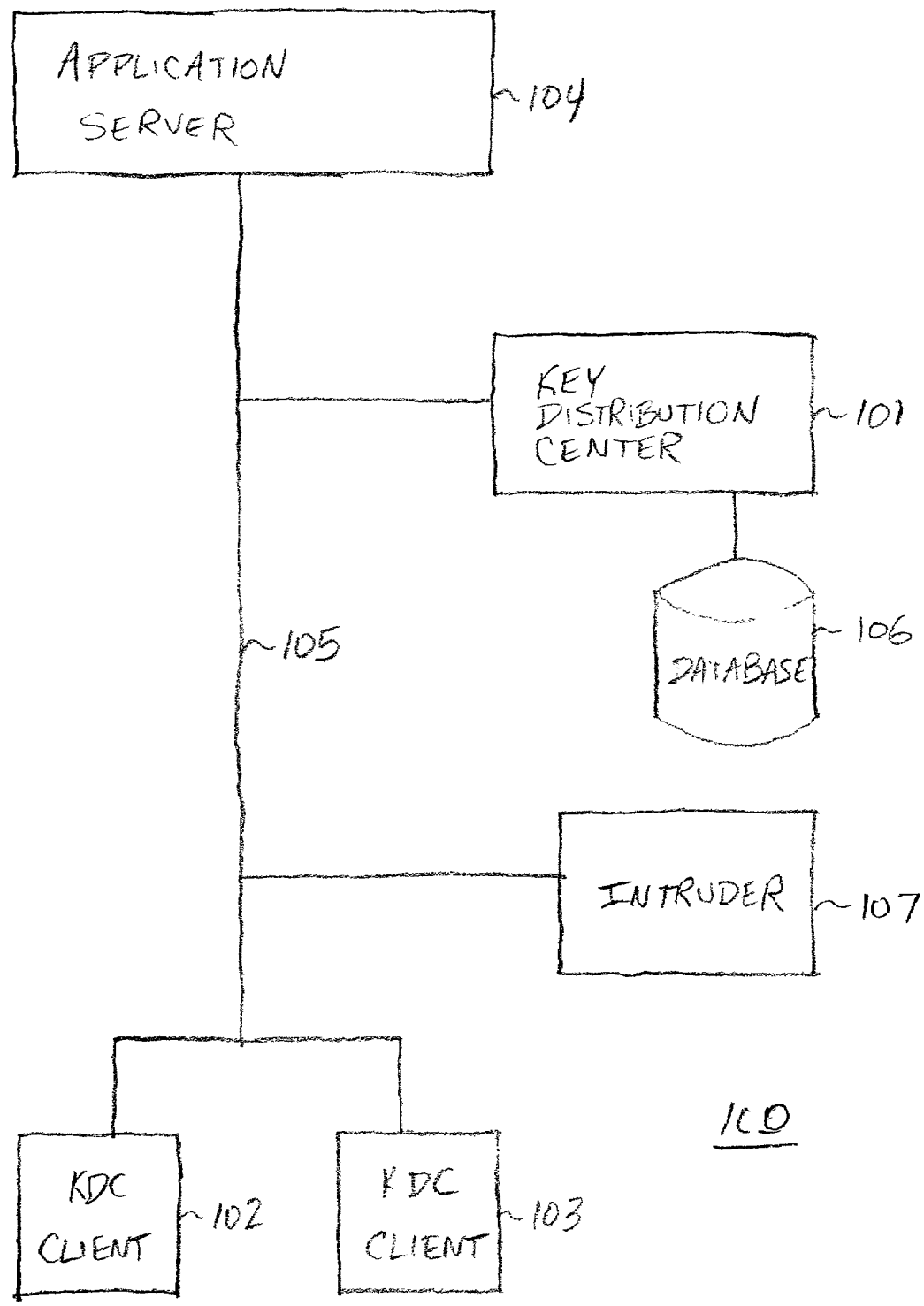
FIG. 1 illustrates a network running a protocol suitable for use with the present invention.

FIG. 1 illustrates a network 105 running the a protocol, such as the Kerberos protocol, suitable for use with the present invention.

In FIG. 1, a Key Distribution Center (KDC) 101, having a Kerberos service, sits on the network 105 and acts as a trusted arbitrator. The Kerberos service provides secure network authentication, thereby allowing an entity to access different machines on the network. Kerberos is based upon symmetric cryptography, such as DES. Kerberos KDC shares a different secret key with every entity on the network and knowledge of that secret key signifies proof of identity. Alternatively, KDC can authenticate the identities of Kerberos clients using digital certificates and digital signatures, while application servers still share their symmetric service keys with the KDC.

If an intruder by some means obtains access to an application server's secret key, the application server and its clients are vulnerable to a variety of abuses that the intruder might perform, and therefore a new application server secret key must be created. However, by creating a new secret key for the application server, and thereby invalidating the compromised application server secret key as well as any tickets that were previously encrypted with that key, the clients having tickets encrypted with the compromised key can no longer use them to obtain service. In the Kerberos model shown in FIG. 1, KDC clients 102 and 103 and application server 104 sit on the network 105. KDC clients 102 and 103 may be users, or alternatively may be independent hardware devices or software programs that need to perform functions such as downloading files, sending messages, accessing databases, accessing printers, or obtaining administrative privileges.

The Kerberos service in the Key Distribution Center 101 keeps a database 106 of the clients 102 and 103 and their secret keys. For a human user, the secret key is an encrypted password. For network services requiring authentication, the application server 104 as well as clients who wish to use these services, register their respective secret keys with the Key Distribution Center 101, and those keys are stored in the database 106.

Alternatively, the Key Distribution Center database 106 contains application server secret keys and client public keys, thus allowing the KDC to authenticate Kerberos clients based on their digital signatures.

Alternatively, the Key Distribution Center database 106 contains application server secret keys and no cryptographic information associated with each client. The KDC is still able to authenticate each Kerberos client based on a digital signature and a digital certificate.

As used herein, a ticket is an authentication token that is given to a client by the KDC 101. Among other information, a ticket contains the name of the client, name of a specific application server 104 and a session key (a symmetric encryption key). The client name and session key need to be kept secret and are encrypted with another key, called a service key. The service key is a secret key that is known only to the KDC and the application server named in the ticket. Because the client 102 does not also possess this service key, it does not have the ability to decrypt the ticket and change its contents. Normally, the client also needs to know the session key and since it cannot get that key out of the ticket, the KDC sends the client a separate copy of the same session key.

In order to provide authentication data for a message with a ticket, a client 102 would include in this message both a ticket and a checksum value for the session key in the ticket. Note that the session key in the ticket is encrypted with the server's service key. When the server named in the ticket receives this message from the client, it is able to decrypt the ticket with its service key, verify the client name and obtain the session key. The session key is then subsequently used to verify the keyed checksum and thus authenticate the whole message.

This ticket-based authentication is part of the Kerberos IETF (Internet engineering task force) standard (RFC 1510) and is also utilized by a proprietary ESBroker protocol. It is also understood that other authentication techniques based on other standards may be employed. A ticket may have other information as well, including a validity period (start time and expiration time), various flags, client authorization data, etc. The authorization data field may contain subscribed services, geographical location, user payment method, and other data relevant to user authorization.

Figure 2:
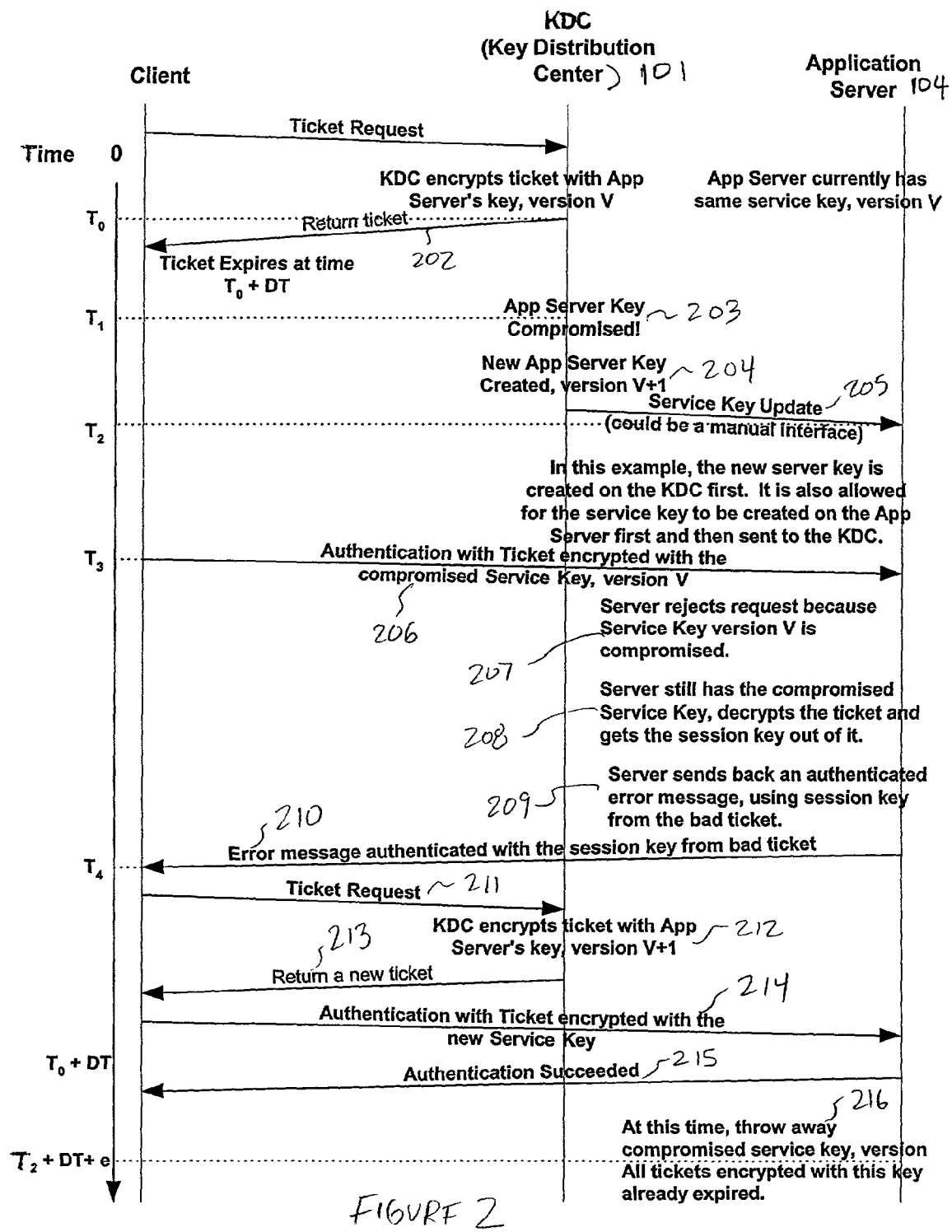
FIG. 2 illustrates a method of updating application server service keys while still permitting automatic recovery for clients.

FIG. 2 illustrates a method of updating application server service keys while still permitting automatic recovery for clients.

At step 201, in order to use the application server 104, the client requests a first ticket for the application server 104 from the Key Distribution Center 101. Assuming that everything is in order, the Key Distribution Center 101 sends the first ticket back to the client at step 202 at time $T_0$, and the client receives the ticket sometime thereafter.

The KDC client will later need the first ticket to be authenticated by the application server 104. The Key Distribution Center 101 issues that ticket at time $T_0$ (or slightly before $T_0$), encrypting it with the service key version V for the application server 104 (service keys corresponding to the application server 104 are used to encrypt tickets and are versioned to facilitate updates). Each issued ticket has a lifetime—this particular first ticket has a lifetime that expires at the time of $T_0+DT$.

At step 203, intruder 107 (FIG. 1) breaks into the application server 104 and steals the secret service key, version V, at the time $T_1$. This compromise is soon discovered.

At step 204, a new service key for the application server 104 is generated by the Key Distribution Center 101, with new version number V+1.

At step 205, this new service key is delivered to the application server 104 at time $T_2$, and is stored in the database 106 thereafter. According to the present invention, the new service key may alternatively be generated on the application server 104, and then delivered to the Key Distribution Center 101. The new application server key may be generated in a variety of locations and by a variety of procedures according to the present invention, such as by manual update at the Key Distribution Center 101.

According to the present invention, even though the application server 104 is now using a new service key, for decrypting tickets, the compromised service key, version V, is nonetheless maintained by the application server 104 for the time period DT after its creation—which is the maximum time period for which any ticket might be issued (in the example shown in FIG. 2, all tickets have a lifetime of DT).

At step 206 at time T3, the client decides to attempt to use the first ticket that it received earlier, now a stale ticket (encrypted with the service key, version V, that has been compromised) and to be authenticated by the specified application server 104.

At step 207, according to the present invention, the application server 104 rejects the ticket.

At step 208, nonetheless, the application server decrypts the first stale ticket with the compromised service key version V, extracts a session key out of the stale ticket, and uses the session key to create an authenticator such as a keyed checksum for an error message at step 209 that is sent back to the client at step 210. The client authenticates the error message by verifying this authenticator with the session key from the stale ticket, and then believes the error message to be authentic and valid even though the stale ticket is encrypted with the compromised version V service key, which is no longer valid with the application server 104.

According to the present invention, a novel technique allows the client to accept only authenticated error messages—thereby avoiding various types of denials of service which would conventionally occur. Because there is no benefit for the intruder 107 that stole the service key to send back such an authenticated error message—it can be safely assumed that the "bad service key version" error message will be sent only by the legitimate application server 104. That is, an intruder that stole the service key would not want the clients to be aware of the fact and thus would not send an error message that specifically indicates that the service key has been stolen. Furthermore, if an intruder that stole the service key did send an error message indicating the theft, it would be telling the truth and thus the error message would still be valid and should be accepted by the client.

At step 211, according to the present invention, this error message causes the client to request a new ticket from the Key Distribution Center 101. The new ticket is encrypted with the currently valid service key, version V+1, by the Key Distribution Center 101, at step 212. The Key Distribution Center 101 sends the new ticket to the client at step 213. The client is then able to automatically recover and be successfully authenticated by the application server 104 at step 214, at which time the application server 104 notifies the client of the success of the authentication at step 215.

In contrast, conventionally, if the "bad service key version error message" were not authenticated, in the conventional case in which nothing is compromised, anyone on the network 100 could send a client such an error message, and this causes the client to go back and unnecessarily get another ticket from the Key Distribution Center 101-denial of service on the Key Distribution Center 101.

At step 216, at time T2+DT+e, the application server 104 believes that it is safe to remove the compromised service key, version V, since by that time all tickets issued with that service key must have expired. The reason that the time at which the compromised service key is removed at time T2+DT+e rather than T2+DT is that the time of day reading on the application server could be slightly behind the time of day reading on the KDC and thus tickets that are already expired according to the KDC clock may still be valid on the application server. This parameter e accounts for the possible clock skew between the KDC and the application server and insures that a ticket that is issued by the KDC just prior to the service key update at the application server (time T2) is successfully decrypted by the application server using the compromised service key and a corresponding error message can still be authenticated.

It should be pointed out that the ticket issued by the KDC in step 202 can be a Ticket Granting Ticket (TGT). In the case of a Ticket Granting Ticket, the application server named in the ticket is the KDC itself and when the client sends a request authenticated with a TGT in step 206, that request is also sent to the KDC. For example, in step 206 the client may be requesting another service ticket from the KDC and that request is authenticated with the TGT. Thus, even when the service key that is compromised belongs to the KDC itself and is used to encrypt Ticket Granting Tickets, a seamless recovery from this compromise is possible using the same procedure that is illustrated in FIG. 2.

Figure 3:
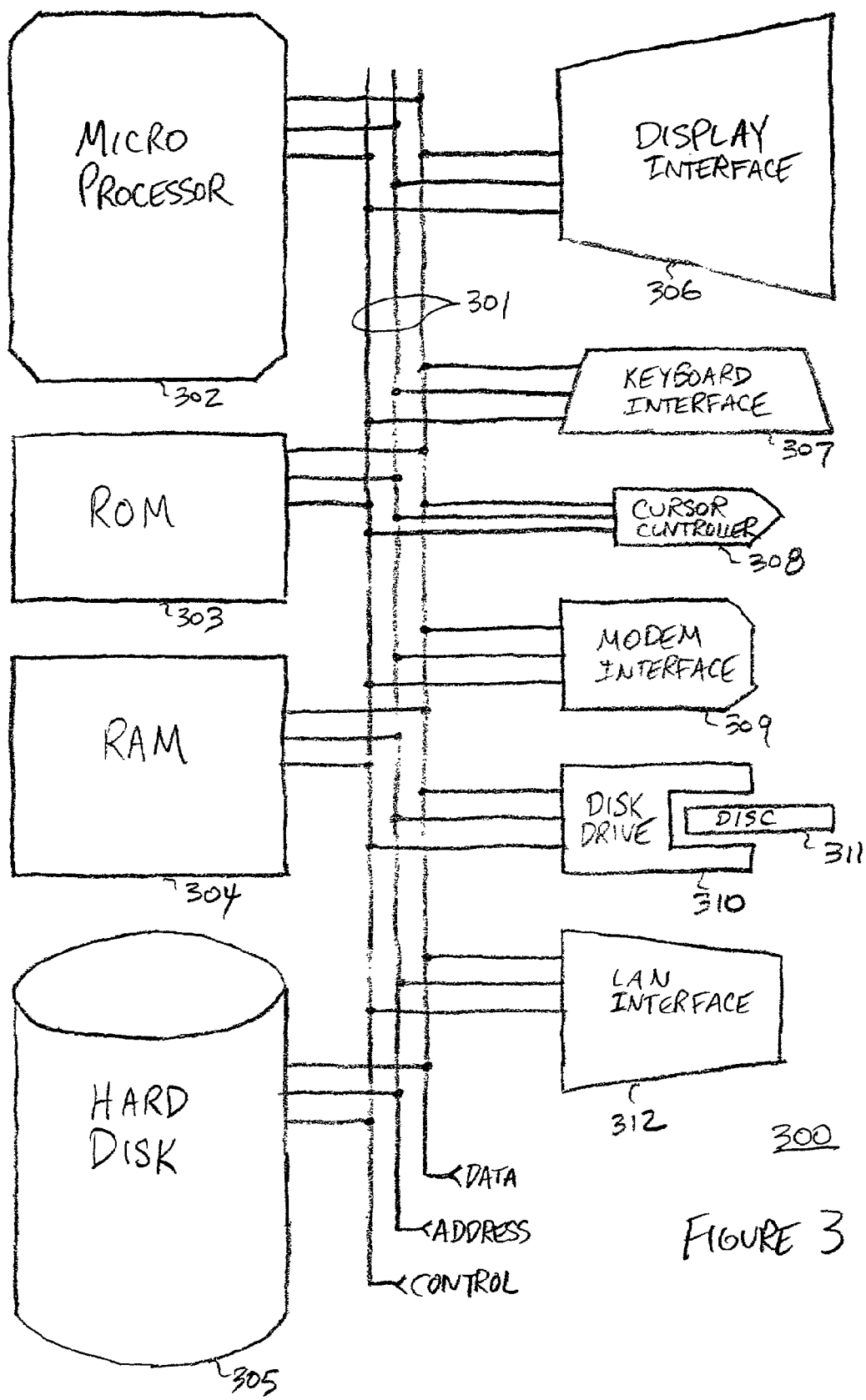
FIG. 3 illustrates a general purpose computer architecture suitable for implementing the various application servers, Key Distribution Centers, and clients that comprise a system for permitting automatic recovery for clients according to the present invention.

FIG. 3 illustrates a general purpose computer architecture 300 suitable for implementing the various clients and application servers according to the present invention.

Among other components, computer architecture 300 includes a microprocessor 302 attached to a data bus 301. A read only memory 303, random access memory 304, and hard disk 305 are in communication with the microprocessor 302. The general purpose computer architecture 300 further includes a display interface 306, keyboard interface 307, and cursor controller 308, such as a mouse.

A CDROM and/or floppy disk drive 310 are suitable for accepting a disc 311, which may contain processor readable program code. A modem interface 309 and local area network interface 312 are operable to connect to a TCP/IP network 105 as shown in FIG. 1, so as to provide connectivity between the various components of a system according to the present invention.

While the present invention has been described with reference to its presently preferred and alternative embodiments, those embodiments are offered by way of example, not by way of limitation. It is to be understood that various additions, deletions, and modifications can be performed to the methods, apparatuses, and systems of the present invention without departing from the spirit and scope of the present invention. Accordingly, all such additions, deletions, and modifications are deemed to lie within the scope of the appended claim.

What is claimed is:

1. A method for automatically recovering from a service key change in a communication system, the method comprising:

receiving a ticket from a client, the ticket being encrypted with a service key;

determining that the service key has been compromised;

decrypting the ticket using the compromised service key;

generating an error message indicative of the detection of the compromised service key;

generating an authenticator to be sent to the client for authenticating the error message, the authenticator being keyed with a session key derived from the compromised service key; and sending the authenticator to the client.

2. The method of claim 1 wherein the acts of receiving, decrypting and generating an authenticator are performed by a Kerberos application server.

3. The method of claim 1 further comprising retaining the compromised service key until all tickets encrypted with the compromised service key have expired.

4. A method for seamlessly updating a compromised service key, the method comprising:

providing a session key from the a client to an application server, the session key being encrypted utilizing the compromised service key;

using the compromised service key to derive the session key; and sending an error message from the application server to the client, the error message being accompanied by an authenticator keyed with the session key.

5. The method of claim 4 further comprising authenticating the error message at the client.

6. The method of claim 4 further comprising automatically requesting a new session key after the error message is received by the client.

7. The method of claim 6 further comprising providing the new session key from the client to the application server.

8. The method of claim 7 further comprising encrypting the new session key with a new service key.

* * * * *

UNITED STATES PATENT AND TRADEMARK OFFICE
CERTIFICATE OF CORRECTION

PATENT NO. : 7,421,083 B2  Page 1 of 1
APPLICATION NO. : 10/117938
DATED : September 2, 2008
INVENTOR(S) : Medvinsky It is certified that error appears in the above-identified patent and that said Letters Patent is hereby corrected as shown below:

COLUMN 4:
Line 14: Please delete "the a" and replace with --a--

COLUMN 8:
Line 18: In Claim 4, please delete "the a" and replace with --the--

Signed and Sealed this

Fifteenth Day of September, 2009

David J. Kappos
*Director of the United States Patent and Trademark Office*